United States Patent Office 3,366,217
Patented Jan. 30, 1968

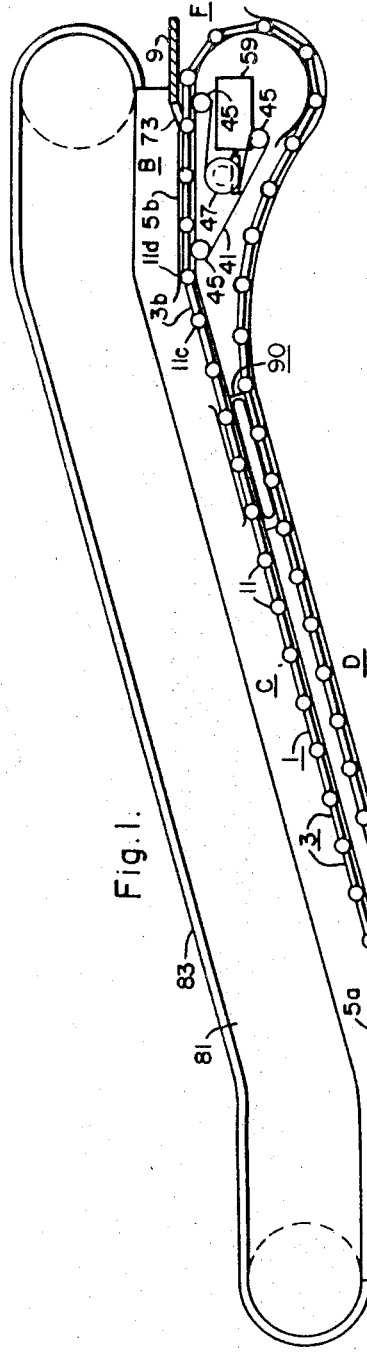
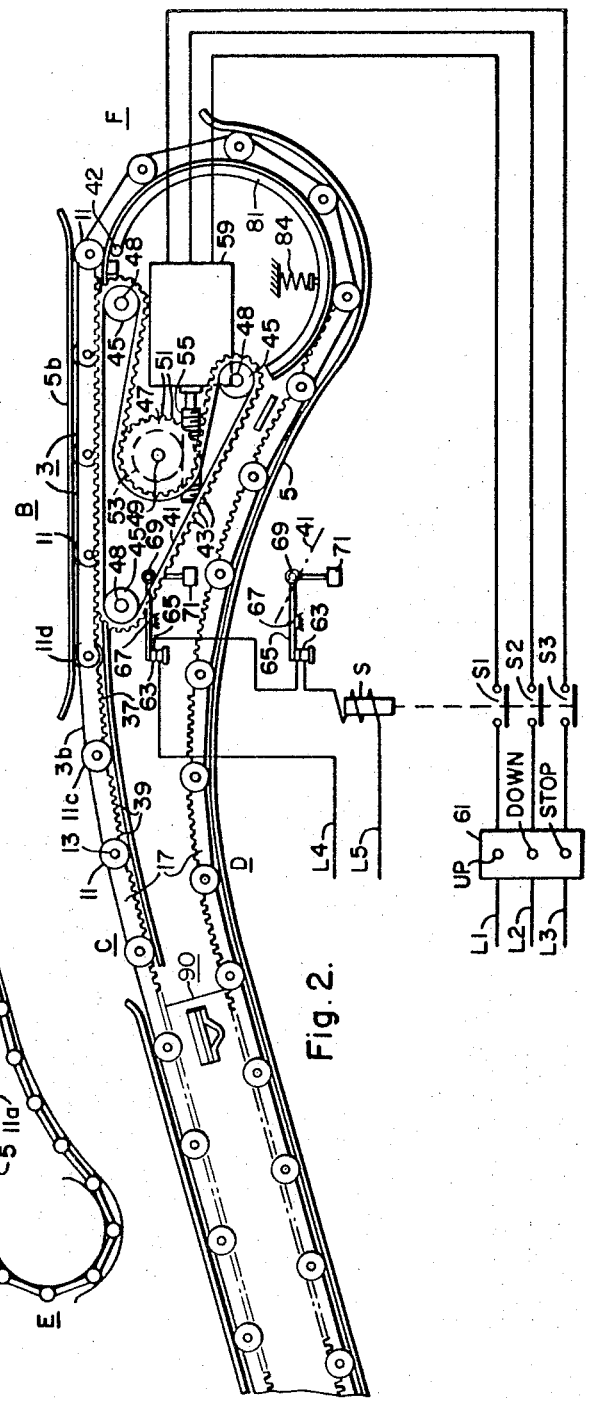

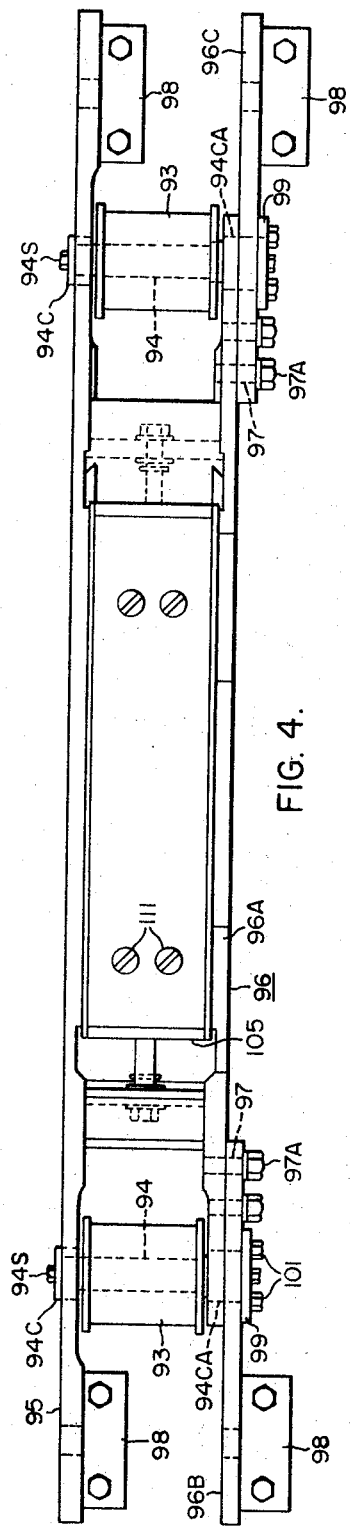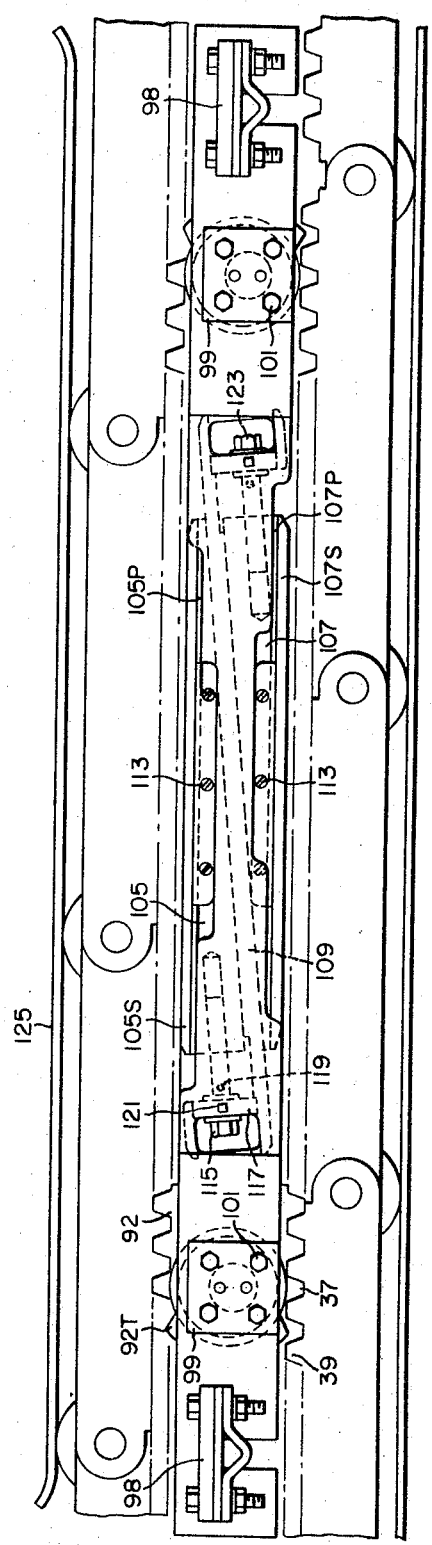

3,366,217
LOAD DISTRIBUTION APPARATUS FOR
ENDLESS BELT CONVEYORS
Larry Tosato, Millburn, and Clyde M. Mullis, Glen Rock,
N.J., assignors to Westinghouse Electric Corporation,
Pittsburgh, Pa., a corporation of Pennsylvania
Filed Mar. 3, 1966, Ser. No. 531,434
3 Claims. (Cl. 198—18)

ABSTRACT OF THE DISCLOSURE

An apparatus for relieving the strain on the upper terminal components of an inclined endless conveyor by transferring the component of the weight of the return portion of the belt which imposes a tension force on the belt to the load bearing upper portion of the belt. A second endless belt is interposed between the upper and lower portions of the load carrying belt so that it couples the two portions near the upper terminal.

This invention relates to endless belt conveyors and it has particular relation to endless belt conveyors operating between landings located at different levels.

Although the invention may be applied to a conveyor having an endless conveyor belt constructed of a continuous ribbon of a reinforced elastomer such as rubber, the invention is particularly suitable for a conveyor belt constructed of an endless series of rigid segments or platforms which may be referred to as pallets. Thus the invention is particularly suitable for moving walks of the type shown in the Rissler and Mullis Patent 3,191,743 and in our copending patent application Ser. No. 377,854, filed June 25, 1964.

A moving walk as described in the aforesaid patent and patent application comprises a belt having an endless series of similar pallets and is so constructed that the path of the belt may follow a course which provides a load transporting run having any desired combination of horizontal and inclined portions. In the aforesaid patent and patent application each of the pallets is substantially rectangular in shape and adjacent pallets are supported in common by a pair of rollers disposed for rotation about a common axis extending transversely to the direction of movement of the pallets. Suitable guides in the form of tracks are provided for the rollers in order to guide the pallets in the desired path.

The load transporting run of the belt extends between two landings which are horizontally and usually vertically spaced from each other. The load transporting run and the return run are interconnected by a semicircular loop of the belt at each end. The tracks on which the rollers run include a load transporting section which extends generally parallel to and adjacent the load transporting run of the conveyor belt and a return run which extends generally parallel to and adjacent the return run of the conveyor belt. The two sections of the tracks are interconnected at each end by semicircular portions.

It is the practice to locate guide means for the conveyor belt adjacent one or both of the landings. The weight of the return run of the belt subjects the rollers and the semicircular portions of the tracks adjacent the upper landing to large strains.

This invention provides an arrangement which may be termed an "indexer" for intercoupling the load transporting and return runs of the belt at a position located intermediate the two landings and preferably closer to the upper landing than to the lower landing. Intercoupling transmits the load due to that portion of the return run located below the indexer to the load transporting run and through such run back to the driving machines. In effect, the indexer by-passes the upper semicircular loop and thus relieves the loop and the rollers passing thereover of a substantial part of the loading due to the weight of the return run of the belt.

One object of our invention is accordingly to provide means intercoupling the load transporting and return runs of an endless conveyor belt in order to transmit force therebetween without introduction of a driving force.

Another object of the invention is to supply means engaging both the load transporting and return runs of an endless conveyor belt to transmit force due to the weight of the return run to the load bearing run.

Another object of the invention is to provide an inclined load conveyor of the endless belt type with means geared to the load transporting and return runs of the belt adjacent an upper landing to transmit force from the return run to the load transporting run thereby relieving upper components of the load conveyor of undue strain.

Yet another object of the invention is to provide an inclined load conveyor of the endless belt type wherein the endless belt in effect provides an endless rack and wherein an endless flexible toothed belt engages racks located in the load transporting and return runs of the belt and wherein adjustments are provided to assure proper mesh between the toothed belt and the racks.

Still another object is to provide a unitary compact and economical structure for the above mentioned intercoupling arrangement of such character that it is readily installed even in existing load conveyors without substantial alterations.

Other objects of the invention will be apparent from the following description taken in conjunction with the accompanying drawings, in which:

FIGURE 1 is a side elevational view of a moving walk embodying the indexer of our invention;

FIG. 2 is a side elevational view to a larger scale showing the upper end portion of the moving walk of FIG. 1 with modifications;

FIG. 3 is a view in side elevation of the load indexer of FIG. 1 together with portions of the associated moving walk components; and FIG. 4 is a view in top plan of the indexer of FIG. 3, with its belt removed.

In order to simplify the presentataion of the invention the present FIGURES 1 and 2 are reproductions of the FIGURES 1 and 2 of the aforesaid Rissler et al. patent except for certain modifications in FIG. 2 as noted below. Components of the patent which are here reproduced are identified by the same reference characters. For convenience it may be pointed out that a continuous articulated belt 1 comprises an endless series of pallets or platforms 3 disposed to be moved along guides or tracks 5 which may be supported by a suitable truss (not shown). The belt 1 has an upper or passenger transporting run extending between a lower landing 7 and an upper landing 9. Each pallet 3 is connected to its neighbors by hinges which turn on the axes of rollers 11. The rollers bear on the tracks 5.

Each pallet comprises a tread board and two side links 17 hinged on the roller axis 13. Each of the pallets has racks 37 provided with teeth 39 through which the conveyor is driven by suitable motive means. Such motive means may be located adjacent either or both of the landings. The motive means may comprise toothed belts 41 trained over idler pulleys 45 and spur gears 47 which are rotated from a motor 59.

The tracks 5 may have curved portions at the ends of the moving walk for the purpose of guiding the rollers around the curved end portions of the belt path as shown in FIG. 1 and in the aforesaid patent. However, as shown in FIG. 2 the upper curved portions preferably are formed as ancillary curved track members 81 pivotally mounted on a hinge 42 and biased outwardly by means of a spring 84. Interlaced fingers guide the rollers 11 between the ancillary curved track members 81 and the fixed portions of the tracks 5. Such ancillary curved track members and associated parts are shown in the aforesaid patent application.

With the components thus far described the weight of the pallets 3 located in the return run is supported substantially by the upper curved portions of the tracks. This results in substantial loading of the rollers and of the curved tracks.

To relieve the rollers and curved portions of stresses and strains incident to the weight of the components located in the return run we provide preferably not far from the upper landing a mechanism termed an "indexer" 90 shown in greater detail in FIGS. 3 and 4. This indexer in effect couples the lower return run of the belt to the upper load transporting run. Thus the weight of the pallets and associated components located in the lower return run below the indexer is transmitted through the indexer to the load transporting run and thence to the drive motor. This materially relieves the rollers and track portions adjacent the upper end of the moving walk from heavy loading by the return run.

Turning to FIGS. 3 and 4 a preferred form of indexer 90 comprises an endless flexible belt 92 which may be constructed of reinforced elastomer such as rubber or other suitable material. This belt runs over a pair of idler sheaves 93 which are journaled respectively on shafts 94 which extend horizontally in a direction transverse to the direction of motion of the pallets adjacent thereto. One end of each of the shafts 94 is received within a cup 94C having a cylindrical outer periphery. This cup conveniently may be secured to the shaft by machine screws 94S. The outer periphery of the cup is snugly received with an opening in a frame member 95 which extends for the full length of the indexer.

The cup 94C is so positioned with respect to the shaft 94 that the periphery of the cup is eccentric relative to the shaft. Consequently by rotating the shaft together with its connected cup 94C the position of the shaft and consequently of the sheave 93 may be adjusted.

At its opposite end each of the shafts 94 is secured to a cup 94CA which has an outer periphery eccentric relative to the shaft in the same manner as the cup 94C. The cup 94CA is snugly but rotatably received in an opening in a frame unit 96. Consequently by rotation of the shaft the position of the shaft and consequently of the associated sheave may be adjusted relative to the associated frame member 95 and frame unit 96.

The frame unit 96 may be similar in construction to the frame member 95. However, for convenience in assembly and servicing the frame unit 96 is made in three parts. These parts include a frame member 96A which does not extend beyond the sheaves 93. At its ends the frame member 96A is secured by studs and nuts 97 and 97A respectively to an extension 96B and an extension 96C. At each end the frame member 95 and the frame unit 96 are provided with clamps 98 by which the indexer may be secured to fixed components (not shown) of the supporting structure for the moving walk.

Each of the cups 94CA is secured in any suitable manner to a rectangular plate 99 which is secured to the associated extension 96B or 96C by four machine screws 101 which are located at the corners of the square. Consequently by removing the four screws 101 for one of the plates 99 the plate may be rotated about the axis of the associated shaft through an angular distance of 90°, 180° or 270° for the purpose of adjusting the position of the associated sheave 93. When properly adjusted the machine screws 101 then may be replaced for the purpose of fixing the shaft 94 in its new position.

The periphery of the belt 92 bears teeth 92T which mesh with the teeth 39 of the racks 37. Preferably the indexer is long enough so that the belt 92 always meshes with a plurality of pallets of both the load transporting and return runs of the conveyor belt. In this way any tendency to non-uniform or jerky transmission of force between the load transporting and return runs is avoided.

To insure good meshing of the teeth 92T with the teeth 39 two slidable wedge-shaped blocks 105 and 107 bear on opposite faces of an inclined plate 109 which extends between and is fixed to the side frame members 95 and 96A in any suitable manner. The blocks 105 and 107 respectively have faces 105F and 107F which extend parallel to the adjacent runs of the belt 92. Each of these faces is covered by a strip or guide bed component respectively 105S and 107S which is formed of a material offering low resistance or friction to the movement of the belt thereagainst. Although these strips may be constructed of a metal preferably they are formed of a plastic material such as nylon.

The strips 105S and 107S may be secured to their respective blocks 105 and 107 in any suitable manner. In the specific embodiment herein shown the strips are secured to backing plates respectively 105P and 107P by countersunk screws 111 and the plates 105P and 107P have flanges which are secured to the associated blocks by means of machine screws 113.

The block 105 is adjusted along the inclined plate 109 by means of an adjusting bolt 115 which extends freely and rotatably through a bridge member 117 into threaded engagement with the block 105. The axis of this bolt is parallel to the inclined plate 109. The bridge member 117 extends between frame members 95 and 96A and is secured thereto in any suitable manner. A washer is positioned between the head of the bolt 115 and one face of the bridge member 117. A second washer is located on the opposite face of the bridge member. Axial movement of the bolt relative to the bridge member is prevented by a roll pin 119 which is a press fit in a hole extending diametrically through the bolt 115. Thus the bolt 115 may be rotated to move the nylon strip 105S towards or from the associated run of the belt 92 for the purpose of establishing proper mesh between the belt and the adjacent racks. When proper adjustment has been effected a set screw 121 may be operated to prevent further rotation of the bolt 115. A bolt 123 is similarly associated with the other block 107.

Ancillary tracks 125 bear against the rollers 11 of the load transporting run of the belt adjacent the indexer to prevent movement of the pallets away from the indexer.

We claim as our invention:

1. A conveyor arrangement comprising a structure having a first station and a second station located at a level higher than the first station, an endless conveyor establishing a closed path having an upper load transporting run and a lower return run extending between said stations, supporting track means extending in substantially a closed path following the closed path of the endless conveyor including curved sections of track forming a substantially semicircular internal radius of the terminal portion of the closed path between the load transporting and return runs adjacent said second station, said endless conveyor having a plurality of rollers spaced along its length engaging said supporting track means for guiding said conveyor about its closed path, drive means for moving the endless conveyor about its closed path, said drive means being connected to the endless conveyor on the upper run adjacent the curved sections of track at said second station, load transfer indexer means comprising an endless belt positioned within the closed path of the endless conveyor, support means for forming the endless belt into first and second elongated runs, guide means including first and second guide units for urging the associated elongated runs into engagement with the associated runs of said endless conveyor, and ancillary track means rigidly positioned parallel to the supporting track means supporting the upper run of said conveyor adjacent the load transfer indexer means and spaced above the supporting track means a distance substantially equal to the diameter of said rollers, whereby the ancillary track means is effective to prevent the upper run of the conveyor from rising up and disengaging from the load transfer indexer means, said load transfer indexer means being located adjacent said second station just below the driving means, whereby the force due to the weight of the return run of said endless conveyor below the load transfer indexer means is relieved from said curved sections of track adjacent the second terminal and the section of said endless conveyor in contact therewith.

2. The conveyor arrangement of claim 1 wherein the endless conveyor has teeth projecting from its inner face to form a substantially continuous flexible internal endless gear, wherein said endless belt has teeth projecting from its outer face to mesh with the teeth of the conveyor on both the load transporting and return runs, wherein said support means comprises spaced idler sheaves rotatably mounted to said structure and wherein the first of said guide units comprises a first wedge shaped guide block having a first face of low friction material adjacent to the associated run of said belt and a second face set at an acute angle to said first face, in combination with a guide member having a first flat surface oriented in a plane which intersects the planes of the parallel runs of the belt at an acute angle, said intersections being perpendicular to the longitudinal axis of the belt, said second face of said guide block being in contact with said first flat surface of the guide member so that movement of the guide block along the flat surface of the guide member moves the associated low friction face toward and away from the associated run, and first adjusting means for adjusting the guide block relative to the guide member.

3. The conveyor arrangement of claim 2 wherein the second guide unit also comprises a wedge-shaped second guide block having a first face of low friction material adjacent to the associated run of said belt and a second face set at an angle to said first face, and wherein said guide member has a second flat surface parallel to said first flat surface, said second face of said second guide block being in contact with the second flat surface of said guide member so that movement of the second guide member along the second flat surface moves the associated low friction face toward and away from the second run of said belt, and separate adjusting means for adjusting the second guide block relative to guide member.

References Cited

UNITED STATES PATENTS

| 802,394 | 10/1905 | Hill | 74—242 |
| 1,043,542 | 11/1912 | Seeberger | 198—18 |
| 1,940,158 | 12/1933 | Vancil | 74—242 |
| 2,863,555 | 12/1958 | Jaritz | 198—203 |
| 3,191,743 | 6/1965 | Rissler | 198—16 |

FOREIGN PATENTS

| 1,196,764 | 5/1959 | France. |
| 950,174 | 10/1956 | Germany. |
| 778,154 | 2/1956 | Great Britain. |

RICHARD E. AEGERTER, *Primary Examiner.*